March 31, 1970    A. SCHWARZKOPF    3,503,830
TWIN-LINE HEAT-SEALING MACHINE FOR TUBING WEBS OR
TWO-PLY FOLDED SHEETING WEBS OF PLASTICS MATERIAL
Filed Dec. 27, 1966    2 Sheets-Sheet 1

INVENTOR
AUGUST SCHWARZKOPF
BY
Woodhams, Blanchard & Flynn
ATTORNEYS

United States Patent Office 3,503,830
Patented Mar. 31, 1970

3,503,830
TWIN-LINE HEAT-SEALING MACHINE FOR TUBING WEBS OR TWO-PLY FOLDED SHEETING WEBS OF PLASTICS MATERIAL
August Schwarzkopf, Lengerich, Germany, assignor to Windmoller & Holscher, Lengerich, Germany
Filed Dec. 27, 1966, Ser. No. 604,881
Claims priority, application Germany, Jan. 28, 1966, W 40,826
Int. Cl. B32b 31/08, 31/18
U.S. Cl. 156—515
8 Claims

ABSTRACT OF THE DISCLOSURE

A twin-line machine for producing transverse heat seals on intermittently advanced tubing webs or two ply, folded sheet webs of plastic material and for severing such webs, which machine is adapted to selectively process two standard webs moving one beside the other or a web having a width which is wider than the standard web. The two processing lines have mutually independent drive means and advancing rolls and movable tool carriers which can be selectively associated with one or both of the processing lines so that the machine is capable of producing products of different lengths.

Figure 1:
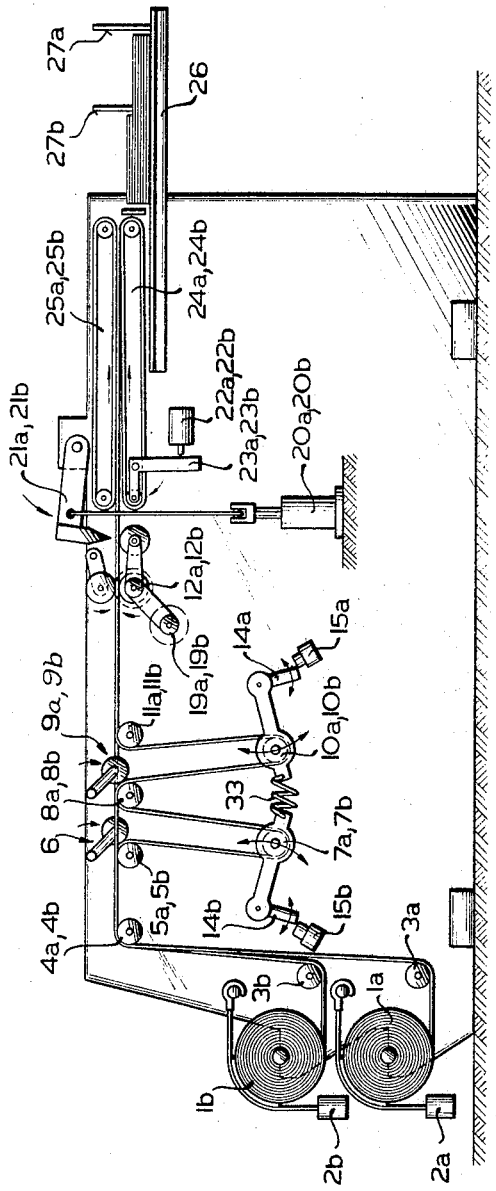

The German Patent No. 1,153,151 describes twin-line machines for processing plastics material, which machines comprise a central drive means, which drives right-hand and left-hand crank-driven rack and pinion mechanisms. Each of the latter mechanisms is adjustable to a predetermined desired length so that the left-hand processing line of the machine may be operated to produce another bag length than the righthand processing line. Owing to the common central drive and the fact that the heat-sealing unit extends across both processing lines, these can operate only in phase with each other. When both webs are printed, left-hand and right-hand photoelectric cells ensure an uncoupling and braking of the associated advancing rolls in time before the crank-driven mechanisms reach their dead center.

As a crank-driven mechanism results in a sinusoidal speed variation, the velocity is low near the dead center and is high in the regions at right angles thereto. As braking from a high speed cannot be exact, braking is effected as closely as possible before the dead center.

During the return movement of the crank-driven mechanism, a heat-sealing bar, which is common to and extends across both processing lines of the machine, is lowered onto a common backing jaw or roll.

When sheeting is to be processed which requires the full working width of the machine, the two sets of feed rolls are mechanically coupled to each other and one of the crank-driven mechanisms is rendered inoperative by disengaging the associated, electrically controlled clutch.

Other twin-line machines are used, which comprise only a single crank-driven and rack and pinion mechanism, which is coupled by respective electrically controlled clutches to the two sets of advancing rolls. This single crank-driven rack and pinion mechanism can obviously be set only to one bag length. The length of the two sheeting sections can be adjusted relative to each other in that the clutch and brake unit which is associated with each set of rolls is operated sooner of later by an adjustable control cam or, when the sheeting is printed, by the associated photoelectric cell. As in the case of substantial differences between the lengths of the two sheeting sections the clutch and brake unit would have to be operated considerably before the crank-driven mechanism reaches its dead center, only small differences between the lengths of the two sheeting sections are possible if lengths inaccuracies are to be avoided.

The latter machines comprise also a heat-sealing bar which extends throughout the width of the machine, and an associated backing bar or roll, so that the heat-sealing operation is initiated and completed throughout the width of the machine during the return movement of the crank-driven mechanism.

When it is desired to process sheeting which requires the full working width of the latter machine, one set of rolls must also be mechanically coupled to the other and the control of the clutch and brake unit for one set of rolls must be synchronized with the control of the other clutch and brake unit or one clutch and brake unit must be rendered inoperative by keeping its clutch disconnected.

The known arrangements have the following disadvantages:

(1) When the supply roll for one processing line has been exhausted or there is a breakdown in one processing line, the second processing line must also be stopped until the cause of the interruption has been removed.

(2) The jobs to be carried out on both processing lines must be identical or at least similar in section length and nature of sheeting. The simultaneous processing of sheetings of greatly different thicknesses and the simultaneous performance of different heat-sealing processes as well as the simultaneous heat-sealing for different periods on the two processing lines is not possible.

(3) When such a machine is making bags of different lengths from two webs, the advancing cycle will be governed by the length of the longest bag as the heat-sealing cycle is the same for both webs. Different from single-line machines, it is not possible with the known twin-line machines to make shorter bags at a higher rate.

Thus, the known twin-line machines have a lower initial cost and lower space requirement but involve such a restriction in production rate in any case in which different bags are to be made on the two processing lines of the machine that such twin-line machines have not been successful so far in spite of their above-mentioned advantages. For this reason it is an object of the invention to provide a twin-line machine which enables a simultaneous optimum utilization of the two processing lines even in the manufacture of bags which differ greatly in length or which are heat-sealed by different processes or for different times.

In a twin-line machine for producing transverse heat seals on intermittently advanced tubing webs or two-ply, folded sheet webs of plastics material, and for severing such webs, which machine is adapted to selectively process two standard webs moving one beside the other, or a web having a width which is wider than standard, and which machine enables products of different lengths to be made at the same time on its two processing lines, the object stated hereinbefore is accomplished according to the invention in that the two processing lines have mutually independent drive means and advancing rolls and the movable tool carriers of the transverse heat-sealing and severing units can be selectively provided with two tools, each of which is associated with one processing line, or with a continuous tool, which extends across both processing lines. In the machine according to the invention the two processing lines are entirely independent of each other when webs of standard width are being processed so that different machine cycles, different heat-sealing processes, and different heat-sealing cycles can be used so as to obtain an optimum processing rate. Operating costs are also reduced when only a single web of standard width is processed because the second processing line need not be operated at all in this case. On the other hand, those advantages of twin-line machines which relate to the initial costs and the space requirement are retained. The invention is based on the recognition that the expense involved in mutually independent drive means for the two processing lines is relatively small in view of the reduction in initial cost obtained by the use of a twin-line machine and will be compensated within very short time by the higher outputs which can be obtained when the two processing lines are optimally utilized also in the manufacture of different bags.

In a further embodiment of the invention, the continuous tool can be obtained by a mechanical coupling of the two line tools so that a transition from the processing of webs of standard width to the processing of wider webs does not require a replacement of tools or tool parts. The line advancing rolls may also be adapted to be mechanically coupled to each other. The driving connection between the advancing rolls of one processing line and their drive means may be arranged to be disconnected so that the entire machine can be driven by the drive means of one processing line during the processing of webs which are wider than standard. Alternatively, the advancing motors of both processing lines may be synchronously controlled so that the advancing motors of both processing lines can also be used during the processing of webs which are wider than standard. In this case it will not be necessary to make the advancing motor of at least one processing line so strong that it can drive the entire machine and feed a double-width tubing web or a two-ply, folded sheeting web, when this is desired. In the last-mentioned embodiment it is sufficient if each advancing motor has the strength which is required for the optimum performance of that processing line with which the respective advancing motor is associated.

In a development of the machine, each processing line may comprise a dancer roll unit for storing the continuously advancing web while the transverse heat-sealing and severing unit performs its working cycle during which the web is at a standstill adjacent to this unit. In this embodiment of the invention, the dancer roll units are suitably arranged one behind the other and extend both throughout the width of the twin-line machine. With this arrangement, wider webs can move around both dancer rolls so that the dancer rolls need not be supported only at one end, as would be the case if the dancer rolls of the two lines of the machine were arranged at the same point of the length of the machine in order to enable a coupling between the shafts of the dancer rolls when wider webs are to be processed. In the latter case, the movement of the dancer rolls would have to be twice as large as is required for processing webs of standard width because the manufacture of wider bags involves also a change in the length of the web portion to be stored during each cycle in accordance with the larger width of the web. To avoid, during the processing of webs of standard width, a superfluous stressing of the web and an increase in the required driving power owing to the need for driving a dancer roll which is designed for a double-width web, each dancer roll shaft may carry two line rolls, which are respectively associated with the two processing lines so that during the processing of webs of standard width only that line dancer roll is driven by the web extending around such roll which lies adjacent to the respective processing line. It will also be desirable to provide a resilient connecting element by which the dancer roll units can be coupled to each other so as to perform similar lifting and lowering movements during the processing of wider webs, when both dancer rolls are used for storing one and the same web.

Figure 2:
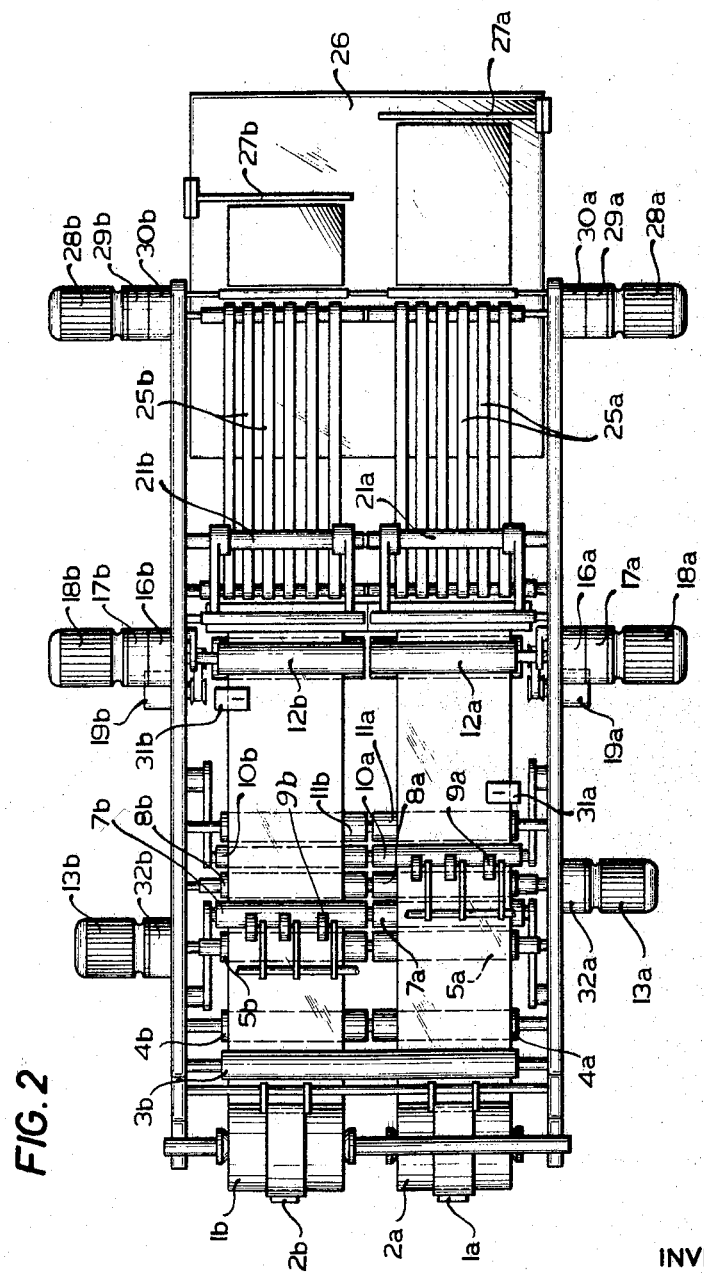

An embodiment of the invention will be explained hereinafter more fully and by way of example with reference to the accompanying drawing, in which FIG. 1 is a diagrammatic side elevation showing a twin-line machine according to the invention and FIG. 2 is a top plan view showing the machine according to FIG. 1.

In the twin-line machine shown in the drawing, the main advancing drive unit for each processing line comprises an electric motor, which is provided with a clutch and a brake. The mode of operation of each processing line is as such no part of the invention and will briefly be described hereinafter:

The length of the web sections is measured either by a millimeter pulse generator or by a photoelectric sensing head. In the first case, the pulses are received by a preset pulse counter, the output of which is applied to an amplifier. In the second case, the photoelectric cells are connected to an amplifier. The output of the respective amplifier is utilized to initiate the uncoupling of the main advancing drive and the braking of the advancing rolls when the preset count has been reached or when the control mark on the sheeting has been sensed. In a sequence of alternating steps, known per se, the jaw closing and heat-sealing cycle is initiated when the advancing cycle has been completed. In the present embodiment, the closing movement is initiated by solenoids and limited by a timer. When the preselected closing time has elapsed, the jaws are opened. During the opening movement, a delivery pulse, which controls the delivery conveyor belts, effects a fast delivery of the heat-sealed sheeting section.

When in the embodiment shown by way of example a follow-up step has been performed so that the dancer roll has reached a predetermined lower position, a new advancing operation is initiated so that the sequence of alternating steps is repeated.

The processing lines of the machine operate as follows:

From the supply roll 1a, which is shown at the right and braked by a strap brake 2a, the path of the sheeting extends around the deflecting roller 3a and the line deflecting roller 4a, and between the follow-up roll 8a and the associated pressure rolls 9a and around the line dancer roll 10a and the line deflecting roll 11a to the line advancing rolls 12a. The follow-up roll 5a and the line dancer roll 7a are not used at this time.

When the right-hand processing line has been started, the follow-up motor 13a is starter, which drives the follow-up rolls 8a, 8b and the speed of which is manually controlled. This causes a lowering of the dancer rolls 10a, 10b so that the control arm 14a, which is secured to the dancer roll lever, is moved into the range of a detector 15a. The latter produces a signal for changing the output of a flip-flop, not shown, which lifts the advancing roll brake 16a and operates the clutch 17a to couple the line advancing rolls 12a to the continuously operating advancing motor 18a. Together with the line advancing rolls, a millimeter pulse generator 19a is operated, which applies pulses to a preset pulse counter, not shown. When the preset count corresponding to the desired length of the section has been counted down, the output of the preset pulse counter causes a resetting of the flip-flop which is associated with the detector so that the clutch 17a is opened and the brake 16a is applied and the advancing rolls are thus stopped.

When the flip-flop is being reset, a second flip-flop, not shown, is shifted to energize the solenoid unit 20a, which causes the line heat-sealing jaws 21a to close and holds them closed until the set time of an adjustable timer has expired.

When the preset closing time has expired, the second flip-flop is reset. The line jaw is opened. During the opening movement of the jaws, the output of another flip-flop energizes the delivery solenoid 22a for a short time, which is controlled by an adjustable timer, so that the delivery lever 23a performs a pivotal movement. This causes the lower line conveyor belt 24a to be urged against the upper belt 25a, whereby the heat-sealed sheeting section is moved out of the heat-sealing station and to the delivery table 26, where the sheeting section runs up against an adjustable line stop 27a.

The line conveyor belt is driven by a controlled motor 28a, which may also be provided with a clutch 29a and a brake 30a. If this delivery motor is provided with a clutch and brake, the delivery belts can operate in synchronism with the main advancing cycle so that there will be no tensile stress at the heat-sealing joint owing to the frictional force of any moving belts during the heat-sealing operation.

In this embodiment, the next advancing cycle will not begin until the control arm 14a of the pivoted lever of the dancer roll moves again into the range of the detector 15a.

During the processing of printed material, the amplifier, not shown, which is associated with the photoelectric cell 31a, rather than the preset pulse counter, causes the setting of the first flip-flop when the control mark has been sensed. As a result, the brake of the line advancing rolls will be applied and these rolls will be uncoupled from the advancing motor 18a.

The left-hand processing line of the machine comprises parts designated with reference characters but having the suffix b and operates in the same manner, with the difference that the follow-up roll 5b and the dancer roll 7b are used rather than the follow-up rolls 8a and 8b and the dancer rolls 10a and 10b. This is necessary because the follow-up rolls 5a, 5b and 8a, 8b, respectively, constitute units which are driven at the same speed by the follow-up motors 13a and 13b, respectively, and each of the pairs of line dancer rolls 7a, 7b and 10a, 10b, respectively, are mounted on a common shaft, which is mounted in common pivoted levers. As the line dancer rolls running freely on this shaft are driven by the web, this would be unnecessarily stressed if it had to drive also the other roll, with which the web is not in contact.

If the sheeting to be processed has such a width that the twin-line machine must operate as a double-width single-line machine, the machine is changed so that the sheeting moves along the following path:

The sheeting is unwound from the top or bottom of a roll rotatably mounted on a shaft. In the former case, the sheeting moves around the deflecting roller 3a. In the latter case, the sheeting moves around the deflecting roller 3b. The sheeting moves then over the free-running line deflecting rollers 4a and 4b and between the line follow-up rolls 5a and 5b, which are mechanically coupled, and the pressure rolls 6, which are arranged in spaced apart positions throughout the entire width. The sheeting moves then around the free-running line dancer rolls 7a and 7b and between the mechanically coupled second line follow-up rolls 8a and 8b and pressure rolls 9, which have been lifted out of engagement. The sheeting moves subsequently around the free-running line dancer rolls 10a and 10b and around the free-running line deflecting rollers 11a and 11b to the advancing unit, which comprises mechanically coupled line rolls 12a and 12b.

The electrically controlled clutch 32a of the follow-up motor 13a on the delivery side of the loop must be opened in this case so that the associated follow-up rolls 8a and 8b, which are mechanically coupled, are free-running and act only as deflecting rollers. The two web loops formed by the dancer rolls 7a, 7b and 10a, 10b are fed as a result of the operation of the follow-up motor 13b on the receiving side of the loop.

The pivoted levers of the dancer rolls 7a, 7b can be connected to the pivoted levers of the dancer rolls 10a, 10b by an elastic connecting element 33 so that both dancer roll units are raised approximately in unison when the advancing unit is started. For this reason, the two loops which are available in the web for the larger size of the sheeting sections required for relatively wide bags will be extended and retracted approximately in unison. As the two advancing motors 18a, 18b have the same speed, both of them may remain coupled if the same length has been preset at the pulse counter.

For processing printed sheeting, one of the two photoelectric cells controls both clutch and brake units of the two advancing motors.

When the sheeting has been advanced by the section length and the advance is stopped, the two solenoids 20a, 20b of the heat-sealing station 21a, 21b are energized at the same time. By a single timer, this energization is maintained for the total closing time of the jaws. The two line jaw beams are provided in this case with a continuous heat-sealing bar. The delivery pulse for releasing and removing the finished section from the heat-sealing station begins and ends at the same time for both lines of the machine.

If the two drive motors 28a and 28b of the delivery station move at the same speed, they may jointly drive the mechanically coupled pulleys for driving the conveyor belts.

Finally, the left-hand or right-hand drive motors may be kept electrically uncoupled so that only the drive motors of the other line drive the mechanically coupled line rolls.

The twin-line machine which has been provided by the invention and which is suitable for processing double-width webs enables for the first time an operation of both lines of the twin-line machines entirely independently of each other so that the working cycles of the two processing lines differ from each other and can be adjusted to the section length of the sections or the heat-sealing time to be obtained on each processing line and a high economy can thus be achieved. The novel machine is also unique in that different heat-sealing processes may be carried out on the two processing lines so that the usefulness of the twin-line machine for the individual processing of two webs is much increased compared to the state of the art and the economy is further improved. Different from the known twin-line machines, any stoppages in one processing line will not effect the other processing line so that the economy is increased still more.

What is claimed is:

1. A twin-line machine for producing transverse heat seals on intermittently advanced tubing webs or two-ply, folded sheet webs of plastic material, and for severing such webs, which machine is adapted to selectively process two standard webs moving one beside the other, or a web having a width which is wider than standard, and which machine enables products of different lengths to be made at the same time on its two processing lines, characterized in that the two processing lines have mutually independent drive means and advancing rolls and the movable tool carriers of the transverse heat-sealing and severing units can be selectively provided with two tools, each of which is associated with one processing line, or with a continuous tool, which extends across both processing lines.

2. A twin-line machine according to claim 1, characterized in that the continuous tool is formed by two line tools, which are mechanically coupled to each other.

3. A twin-line machine according to claim 1, characterized in that the advancing rolls of the two processing lines are adapted to be mechanically coupled to each other.

4. A twin-line machine according to claim 3, characterized in that the driving connection between the advancing rolls of one processing line and its drive means is adapted to be disconnected.

5. A twin-line machine according to claim 1, characterized in that the advancing motors of the two processing lines are controlled in synchronism with each other.

6. A twin-line machine according to claim 1, characterized in that a dancer roll unit, known per se, is provided for each processing line, the dancer roll units are arranged one behind the other and each of them extends throughout the width of the twin-line machine.

7. A twin-line machine according to claim 6, characterized in that each dancer roll shaft carries two rolls, each of which extends across one processing line.

8. A twin-line machine according to claim 6, characterized by an elastic connecting element for coupling the two dancer roll units.

References Cited

UNITED STATES PATENTS

| | | | |
|---|---|---|---|
| 889,746 | 6/1908 | Bechman | 226—109 |
| 1,161,563 | 11/1915 | West | 226—109 X |
| 1,516,613 | 11/1924 | MacDonald | 156—511 |
| 2,947,345 | 8/1960 | Schjeldahl | 156—515 X |

VERLIN R. PENDEGRASS, Primary Examiner

U.S. Cl. X.R.

156—351